US012637213B2

(12) United States Patent　　　(10) Patent No.: US 12,637,213 B2
　　Hamamoto　　　　　　　　　　　　(45) Date of Patent:　May 26, 2026

(54) FLAPPING DEVICE

(71) Applicant: NAKAKITA SEISAKUSHO CO. LTD., Osaka (JP)

(72) Inventor: Masaki Hamamoto, Osaka (JP)

(73) Assignee: NAKAKITA SEISAKUSHO CO. LTD., Osaka (JP)

( * ) Notice: Subject to any disclaimer, the term of this patent is extended or adjusted under 35 U.S.C. 154(b) by 0 days.

(21) Appl. No.: 19/121,782

(22) PCT Filed: Oct. 6, 2023

(86) PCT No.: PCT/JP2023/036652
　　§ 371 (c)(1),
　　(2) Date: Apr. 16, 2025

(87) PCT Pub. No.: WO2024/085012
　　PCT Pub. Date: Apr. 25, 2024

(65) Prior Publication Data
　　US 2025/0388319 A1　　Dec. 25, 2025

(30) Foreign Application Priority Data
　　Oct. 17, 2022　(JP) ................................. 2022-166557

(51) Int. Cl.
　　B64C 33/02　　　　(2006.01)
(52) U.S. Cl.
　　CPC ..................................... B64C 33/02 (2013.01)
(58) Field of Classification Search
　　CPC ........ B64C 33/00; B64C 33/02; B64C 33/025
　　See application file for complete search history.

(56) References Cited

U.S. PATENT DOCUMENTS

2014/0061379 A1　3/2014　Campolo et al.
2015/0307191 A1*　10/2015　Samuel .................. B64U 10/40
　　　　　　　　　　　　　　　　　　　　　　　　244/22
2016/0159477 A1*　6/2016　Deng ...................... B64C 33/02
　　　　　　　　　　　　　　　　　　　　　　　　244/22

FOREIGN PATENT DOCUMENTS

JP　　　　2013-103702 A　　5/2013

OTHER PUBLICATIONS

WIPO, Japan Patent Office Search Authority, International Search Report (with English translation) and Written Opinion mailed Dec. 19, 2023 in International Patent Application No. PCT/JP2023/036652, 8 pages.

* cited by examiner

*Primary Examiner* — Valentina Xavier
(74) *Attorney, Agent, or Firm* — MASUVALLEY & PARTNERS; Peter Martinez

(57)　　　　　ABSTRACT

A flapping device that is compact and is capable of acquiring high mobility is provided.

A flapping device 1 has blades 2, 2 and a pair of drive units 3, 3 disposed in correspondence with the blades 2, 2, and the drive unit 3 includes: a first drive source 30U; a second drive source 30D; a first driven part 10U being rotated around a first rotation axial line by the first drive source 30U; a second driven part 10D being rotated around a second rotation axial line by the second drive source 30D; a first vibration excitation member 40U biasing the first driven part 10U in a direction opposite to a rotation direction of the first driven part 10U; a second vibration excitation member 40D biasing the second driven part 10D in a direction opposite to a rotation direction of the second driven part 10D; and a control unit 60. The blade 2 has: a first blade shaft 20 that is connected to the first driven part 10U and is rotatable around a third rotation axial line intersecting a first rotation (Continued)

axial line; a second blade shaft 21 that is connected to the second driven part 10D and is rotatable around a fourth rotation axial line intersecting a second rotation axial line; and a blade main body 22.

9 Claims, 11 Drawing Sheets

UPPER SIDE
(U SIDE)

LOWER SIDE
(D SIDE)

FLAPPING DEVICE

RELATED APPLICATIONS

This application is the U.S. National Phase of and claims priority to International Patent Application No. PCT/JP2023/036652, International Filing Date Oct. 6, 2023, entitled Flapping Device; which claims priority to Japanese Patent Application No. JP2022-166557 filed Oct. 17, 2022; both of which are incorporated herein by reference in their entireties.

TECHNICAL FIELD

The present invention relates to a flapping device that acquires a lift force by oscillating blades.

BACKGROUND ART

Conventionally, flapping devices have been used for surveillance, photographing, various inspections, and the like from above. As the flapping device described above, a flapping wing micro-airplane system (hereinafter referred to simply as "flapping device") that directly drives a flapping wing (corresponding to a blade) using a DC motor is known. Since it is difficult to design DC motors to produce a high torque in accordance with downsizing, and electrical-mechanical energy conversion efficiency (hereafter referred to simply as "efficiency") takes a peak in a high-speed rotation range (generally 70% to 85% of a no-load rotation speed), flapping mechanisms that flap blades by converting a unidirectional rotational motion into a reciprocating rotational motion using a link mechanism have been used in many cases. On the other hand, it was recently discovered that mechanisms expanding a flapping stroke using a resonance phenomenon are used in flapping of living organisms such as insects and the like, and, by using this knowledge, by constructing a resonance system using a torsion spring, an aircraft capable of performing stand-alone lift is realized even in a configuration using a small DC motor with a low torque (for example, PTL 1).

A flapping device described in PTL 1 described above is configured to directly drive blades by driving a DC motor connected to a torsion spring. The flapping device described in PTL 1 described above is considered to vibrate a spring-mass system composed of a restoring force of the torsion spring and an inertia force of the entire system (blades, a driving force transmission system, and a rotor of the DC motor described above) by causing the DC motor to perform a reciprocating rotational motion. PTL 1 described above indicates that, when the excitation frequency of the DC motor is equal to the natural frequency $(2*I*\sqrt{(K/I)}$, where K is the spring constant of the torsion spring, and I is the rotational inertia of the entire system described above) of the spring-mass system described above, the drive efficiency of the motor is maximized, and a flap amplitude and a lift force are maximized as well. In other words, in this configuration, it is advantageous to set the flap frequency near the natural frequency of the spring-mass system described above for lift. For this reason, in a case in which the mass of the blades is large or the rotational inertia of the motor rotor is large, a torsion spring with a high spring constant is naturally used.

CITATION LIST

Patent Literature

PTL 1: U.S. Patent Application Publication No. 2016/159477

SUMMARY OF INVENTION

Technical Problem

Meanwhile, in recent years, as the use of flapping devices has diversified, there has been a growing demand for compact and high-mobility flapping devices. However, in the flapping device described in PTL 1 described above, driving of the blades is configured with one degree of freedom, and, for example, the angle of attack of the blades cannot be changed independently of the stroke, and it was difficult to drive the blades with a high precision. In addition, the flapping device described in PTL 1 described above, for example, needs to raise the output of the motor in a case in which a difference between motions of right and left blades is configured to be large (in a case in which a large attitude control torque is generated).

In addition, although increasing the capacity of the motor may be considered to increase the mobility of the flapping device, there are concerns that this would cause an increase in the size of the flapping device and an increase in the cost. Instead of increasing the capacity of the motor, it may be considered to raise the frequency associated with flapping by raising the spring constant of the torsion spring. However, in the flapping device described in PTL 1 described above, in a case in which the spring constant of the torsion spring becomes large, there are concerns that it would affect a yaw directional motion, and it becomes difficult to secure the stroke of the blades.

Thus, an object of the present invention is to provide a flapping device that is compact and can acquire high mobility.

Solution to Problem (1) In order to solve the problems described above, according to the present invention, there is provided a flapping device including: a pair of blades; and a pair of drive units disposed in correspondence with the pair of blades, in which the drive unit includes: a first drive source; a second drive source; a first driven part receiving power output from the first drive source and rotating around a first rotation axial line; a second driven part receiving power output from the second drive source and rotating around a second rotation axial line; a first vibration excitation member applying a biasing force to the first driven part in a direction opposite to a rotation direction of the first driven part in accordance with rotation of the first driven part; a second vibration excitation member applying a biasing force to the second driven part in a direction opposite to a rotation direction of the second driven part in accordance with rotation of the second driven part; and a control unit performing output control of driving forces of the first drive source and the second drive source, and the blade has: a first blade shaft extending in a predetermined axial line direction and being connected to the first driven part on a one end side and connected rotatably in a third rotation axial line surrounding direction intersecting the first rotation axial line; a second blade shaft extending in a direction intersecting the first blade shaft and being connected to the second driven part on a one end side and connected rotatably in a fourth rotation axial line surrounding direction intersecting the second rotation axial line; and a blade main body disposed over the first blade shaft and the second blade shaft.

In the flapping device described above, the first blade shaft is driven by the first drive source, and the second blade shaft is driven by the second drive source. In other words, the blades are driven by both the first drive source and the second drive source, and the stroke angle of blades according to the rotation angle of the first drive source is defined as the angle of attack of the blades in accordance with a difference between the rotation angles of the first drive source and the second drive source. In accordance with this, the flapping device described above can individually control the stroke and the angle of attack, and thus flight with higher mobility such as moving in a horizontal direction with the attitude maintained can be performed.

Here, although various motors and the like can be used as the first drive source and the second drive source (both are simply also referred to as drive sources altogether), brushless DC motors that can be easily rotated in forward and reverse directions and have a high power-to-weight ratio can preferably be used. In accordance with this, battery driving can be easily performed, and the control can be easily performed as well.

In addition, the flapping device described above can excite the first blade shaft and the second blade shaft in the first rotation axial line surrounding direction and the second rotation axial line surrounding direction using biasing using the first vibration excitation member and the second vibration excitation member (both are also referred to as vibration excitation members altogether). Thus, the flapping device described above can amplify the flapping frequency of one pair of blades through excitation and thus can drive the pair of blades at high speed. For example, a torsion spring or the like capable of biasing a torque in a torsional direction can preferably be used for the vibration excitation members described above.

Here, as a result of a diligent study of the inventors and the like of the present invention, knowledge indicating that, by improving the flapping frequency of the flapping device, the influence of disturbances can be reduced, and control can be easily performed was obtained. Based on the knowledge described above, in order to increase the flapping frequency, for example, it may be considered to increase the spring constant of the torsion springs or the like used in the vibration excitation members. However, in a case in which the spring constant of the vibration excitation members (for example, torsion springs) is raised, the restoring force also becomes stronger, resulting in a larger load, and there is concern that it would become difficult to stroke the blade shafts. As a result, there is concern that the lift force would be reduced.

In addition, for example, in order to move the flapping device in a pitch direction, the amplitude centers of the first vibration excitation member and the second vibration excitation member need to be offset to one side or the other side (hereinafter, also referred to as a forward/backward direction) in the first rotation axial line surrounding direction and the second rotation axial line surrounding direction. However, in a case in which the flapping device is offset to the forward/backward direction, there is a problem that it becomes difficult to perform offsetting in accordance with restoring forces of the vibration excitation members. In addition, in a case in which the spring constant of the vibration excitation members is raised, the restoring forces become even stronger, and thus there is a problem that the offsetting described above becomes more difficult. For this reason, there is demand for a flapping device capable of achieving stabilization of control of the drive unit while improving the flapping frequency.

(2) Thus, in order to solve the problems described above, according to the present invention, there is provided a flapping device including: a pair of blades; and a pair of drive units disposed in correspondence with the pair of blades, in which the drive unit includes: a first drive source; a second drive source; a first driven part receiving power output from the first drive source and rotating around a first rotation axial line; a second driven part receiving power output from the second drive source and rotating around a second rotation axial line; a first vibration excitation member applying a biasing force to the first driven part in a direction opposite to a rotation direction of the first driven part in accordance with rotation of the first driven part; a second vibration excitation member applying a biasing force to the second driven part in a direction opposite to a rotation direction of the second driven part in accordance with rotation of the second driven part; and a control unit performing output control of driving forces of the first drive source and the second drive source, the blade has: a first blade shaft extending in a predetermined axial line direction and being connected to the first driven part on a one end side and connected rotatably in a third rotation axial line surrounding direction intersecting the first rotation axial line; a second blade shaft extending in a direction intersecting the first blade shaft and being connected to the second driven part on a one end side and connected rotatably in a fourth rotation axial line surrounding direction intersecting the second rotation axial line; and a blade main body disposed over the first blade shaft and the second blade shaft, the first vibration excitation member is connected to the first driven part on a one end side and is directly or indirectly connected to the first blade shaft on the other end side, and the second vibration excitation member is connected to the second driven part on a one end side and is directly or indirectly connected to the second blade shaft on the other end side.

In the flapping device described above, the one end side of the first vibration excitation member is connected to the first driven part, and the other end side is directly or indirectly connected to the first blade shaft. In addition, in the flapping device described above, the one end side of the second vibration excitation member is connected to the second driven part, and the other end side is connected to the second blade shaft. In other words, the first vibration excitation member and the second vibration excitation member (both are also referred to as vibration excitation members altogether) have one end sides not being fixed to a body that constitutes the flapping device but being fixed to the first driven part and the second driven part. In other words, one end sides of the vibration excitation members form free ends. The flapping device described above can excite the first blade shaft and the second blade shaft without being affected by the restoring forces of the vibration excitation members even in a case in which a torque (a biasing force) is applied to the vibration excitation members. In other words, the flapping device described above can directly apply a torque to the first blade shaft and the second blade shaft. In accordance with this, stabilization of the output control of the drive sources can be expected. For example, a torsion spring or the like capable of biasing a torque in a torsional direction can preferably be used for the vibration excitation members described above.

In the flapping device described above, one end sides of the vibration excitation members are formed as free ends, and thus, even if the spring constant of the vibration excitation members is raised, it is unlikely to be influenced by the restoring forces of the vibration excitation members. Thus, according to the flapping device described above, since the flapping frequency can be improved by raising the spring constants of the vibration excitation members, stabilization of the output control of the drive sources can be expected. In addition, since the weight of the vibration excitation members can be increased in accordance with the improvement of the spring constants of the vibration excitation members, a further reduction in the influence of disturbances can be expected.

In the flapping device described above, the first blade shaft is driven by the first drive source, and the second blade shaft is driven by the second drive source. In other words, the blades are driven by both the first drive source and the second drive source, and the stroke angle of the blades according to the rotation angle of the first drive source is defined as the angle of attack of the blades in accordance with a difference between the rotation angles of the first drive source and the second drive source. In accordance with this, the flapping device described above can individually control the stroke and the angle of attack, and thus flight with higher mobility such as moving in a horizontal direction with the attitude maintained can be performed.

Here, although various motors and the like can be used as the first drive source and the second drive source (both are simply also referred to as drive sources altogether), brushless DC motors that can be easily rotated in forward and reverse directions and have a high power-to-weight ratio can preferably be used. In accordance with this, battery driving can be easily performed, and the control can be easily performed as well.

Here, for example, in a case in which the blade is formed in a fan shape, the second blade shaft is arranged in the fourth rotation axial line direction that is inclined with respect to the third rotation axial line in the first blade shaft, and thus, the second blade shaft needs to be supported to be rotatable around the fourth rotation axial line intersecting the first blade shaft. For this reason, it is preferable that the support part of the second blade shaft should be inclined in accordance with the fourth rotation axial line.

(3) Thus, the flapping device according to the present invention described above may further include: a link member being connected to the second driven part to be rotatable in a fifth axial line surrounding direction intersecting the second rotation axial line on a one end side, in which the link member may be formed such that the other end side extends toward the second blade shaft, and the second blade shaft may be connected to the link member to be rotatable in the fourth rotation axial line surrounding direction.

By employing such a configuration, even in a case in which the second blade shaft is inclined with respect to the first blade shaft (for example, in a case in which the blade is formed in a fan shape), the flapping device described above can reliably support the second blade shaft to be rotatable in accordance with the inclination direction (the fourth rotation axial line direction). In accordance with this, the degree of freedom in design and the aerodynamic characteristics of the blade can be expected to be improved.

Here, in a case in which an in-runner motor is used as the drive source, the inertia according to the rotor of the motor is small, and thus the influence of changes in the inertia of the blades applied to the first blade shaft and the second blade shaft according to changes in the attitude (the angle of attack) of the blades becomes relatively large. In accordance with this, the resonance frequency greatly changes, and the resonance coefficient (the amplification factor of the blade amplitude) greatly changes furthermore, and thus changes in the blade amplitude need to be considered in control of the blades, and there is a problem that the control becomes complex. Thus, as a result of a further study of the inventors and the like, knowledge indicating that, when an outrunner motor having large inertia according to the rotor relative to an in-runner motor is used, the amount of change of the inertia of the first blade shaft and the second blade shaft according to an attitude change of the blades is small relative to the large inertia of the rotor of an outrunner motor, and thus a change in the resonance frequency of the resonance system and a change in the blade amplitude become small, and the control can be easily performed was acquired.

(4) Thus, in the flapping device according to the present invention described above, the first drive source and the second drive source may be configured using outrunner motors as DC motors.

The flapping device described above can reduce the cost of the first drive source and the second drive source by using outrunner motors that are less expensive than in-runner motors. Therefore, by substituting four units of one pair of first drive sources and one pair of second drive sources with outrunner motors, the flapping device described above can be expected to further reduce costs. In addition, by using the outrunner motor, the flapping device described above can reduce a change in the resonance frequency of the resonance system and a change in the blade amplitude, and thus further stabilization of the control can be expected.

Here, as a result of a diligent study of the inventors and the like, knowledge indicating that, in the flapping device described above, the electrical and mechanical conversion efficiency of the drive unit (for example, a motor) tends to decrease at the time of turnaround (switching between forward movement and backward movement) in the reciprocating motion of the blade was acquired. In the flapping device described above, in accordance with restoring forces of the first vibration excitation member and the second vibration excitation member, autonomous switching of the reciprocating motion is performed at a turnaround end in the reciprocating motion of the blade. For this reason, by stopping the motor at the turnaround end of the reciprocating motion of the blades and causing excitation to be performed only in a region near the flap center in which the angular velocity of the blades is high, the efficiency of the motor is considered to be improved.

(5) Thus, in the flapping device described above, the control unit may perform control of stopping output of driving forces of the first drive source and the second drive source before a predetermined time at which rotation speeds of the first drive source and the second drive source become zero in switching of forward rotation or backward rotation of the first drive source and the second drive source and control of resuming the output of the driving forces of the first drive source and the second drive source at a time point at which forward movement or backward movement is switched in the blade in accordance with restoring forces of the first vibration excitation member and the second vibration excitation member.

The flapping device described above is configured to perform control of stopping driving of the first drive source and the second drive source (hereinafter, simply referred to as drive sources) before a predetermined time at which rotation speeds of the drive sources become zero in switching of forward rotation or backward rotation of the first drive source and the second drive source. In accordance with this, the drive according to the drive source can stop in a part in which the efficiency of the drive source decreases, and thus waste from the output of the drive source can be reduced, and the improvement of the electric cost of the drive battery can be expected. In this way, the flapping device described above can efficiently move the blades back and forth. In addition, the flapping device described above is configured to perform control of resuming the drive of the drive source at a time point at which the forward movement or the backward movement is switched in the pair of the blades in accordance with the restoring forces of the first vibration excitation member and the second vibration excitation member. In accordance with this, the flapping device described above can excite the blades in regions near the flap center in which the angular velocity of the blades is high. In addition, the flapping device described above can efficiently perform a flapping motion without increasing the capacity of the drive source. For this reason, downsizing of the flapping device described above can be expected.

(6) In the flapping device according to the present invention described above, the control unit may be able to execute: first offset control of offsetting an amplitude center of the first vibration excitation member to one side or the other side around the first rotation axial line by a predetermined amount; and second offset control of offsetting an amplitude center of the second vibration excitation member to one side or the other side around the second rotation axial line by a predetermined amount, and the first offset control and the second offset control may be executed by applying a predetermined amount of offset to drive voltage waveforms of the first drive source and the second drive source.

By applying a predetermined amount of offset to drive voltage waveforms of the first drive source and the second drive source, the flapping device described above can easily execute the first offset control and the second offset control. For this reason, according to the flapping device described above, stabilization of control can be expected while performing high-precision control.

Here, in the first offset control and the second offset control described above, in a case in which the one end side of the first vibration excitation member and the second vibration excitation member (both are also referred to as vibration excitation members altogether) is formed as a free end, there is concern that the amplitude center of the vibration excitation member after offsetting deviates from a scheduled amplitude center (also referred to as a reference position) in accordance with the excitation of the vibration excitation members.

(7) Thus, the flapping device according to the present invention described above may further include: a body supporting the pair of drive units; a third vibration excitation member applying a biasing force to the first driven part in a direction opposite to a rotation direction of the first driven part in accordance with rotation of the first driven part; and a fourth vibration excitation member applying a biasing force to the second driven part in a direction opposite to a rotation direction of the second driven part in accordance with rotation of the second driven part, in which the third vibration excitation member may be connected to the body on a one end side and be directly or indirectly connected to the first blade shaft on the other end side, the fourth vibration excitation member may be connected to the body on a one end side and be directly or indirectly connected to the second blade shaft on the other end side, and the third vibration excitation member and the fourth vibration excitation member may be formed to be able to exert a biasing force that is smaller than the biasing forces of the first vibration excitation member and the second vibration excitation member and exert a biasing force capable of returning the amplitude center of the first vibration excitation member and the second vibration excitation member to a reference position.

By employing such a configuration, even when one end side of the first vibration excitation member and the second vibration excitation member is formed as a free end, the flapping device described above can return the amplitude centers of the first vibration excitation member and the second vibration excitation member to the reference position (a scheduled amplitude center). For this reason, according to the flapping device described above, even higher precision and stability of control can be expected.

(8) In the flapping device according to the present invention described above, the control unit may perform control of forming a difference between phases of outputs of the first drive source and the second drive source such that the blade is inclined in a direction opposite to a direction of travel by a predetermined angle.

By employing such a configuration, the flapping device described above can efficiently generate a lift force.

Here, in a case in which outrunner motors are used as the first drive source and the second drive source, the rotor of the outer circumference part rotates, and thus there is concern that the rotor and each part would interfere with each other.

(9) Thus, the flapping device according to the present invention described above may further include: a body supporting the pair of drive units, in which the body has a pair of support parts disposed spaced apart, the first drive source and the second drive source may be arranged outside of the pair of support parts, and the first vibration excitation member, the second vibration excitation member, the first driven part, and the second driven part may be arranged between the pair of support parts.

By employing such a configuration, in the flapping device described above, the first drive source and the second drive source (both are also referred to as drive sources altogether), the first vibration excitation member, the second vibration excitation member, the first driven part, and the second driven part do not interfere with each other. For this reason, for example, in a case in which outrunner motors are used as drive sources, the flapping device described above can curb the rotors of the outrunner motors interfering with the first vibration excitation member, the second vibration excitation member, the first driven part, and the second driven part. In this way, even in a case in which rotors are exposed as in the case of outrunner motors, the flapping device described above can curb increase in the size of the device.

Advantageous Effects of Invention

According to the present invention, a flapping device that is compact and can acquire high mobility can be provided.

DESCRIPTION OF EMBODIMENTS

Figure 1:
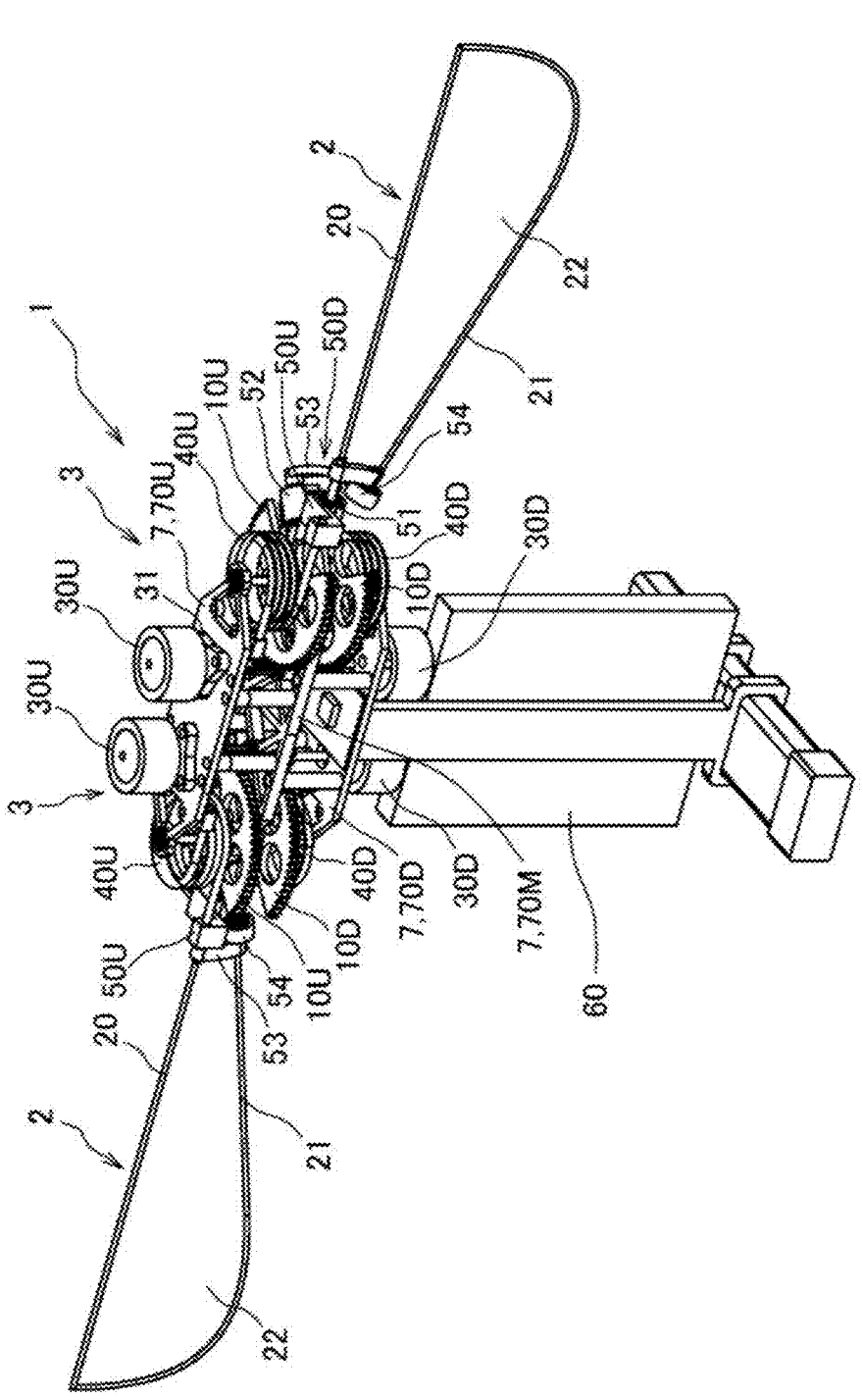
FIG. 1 is a perspective view of a whole flapping device according to a first embodiment of the present invention.
Figure 2:
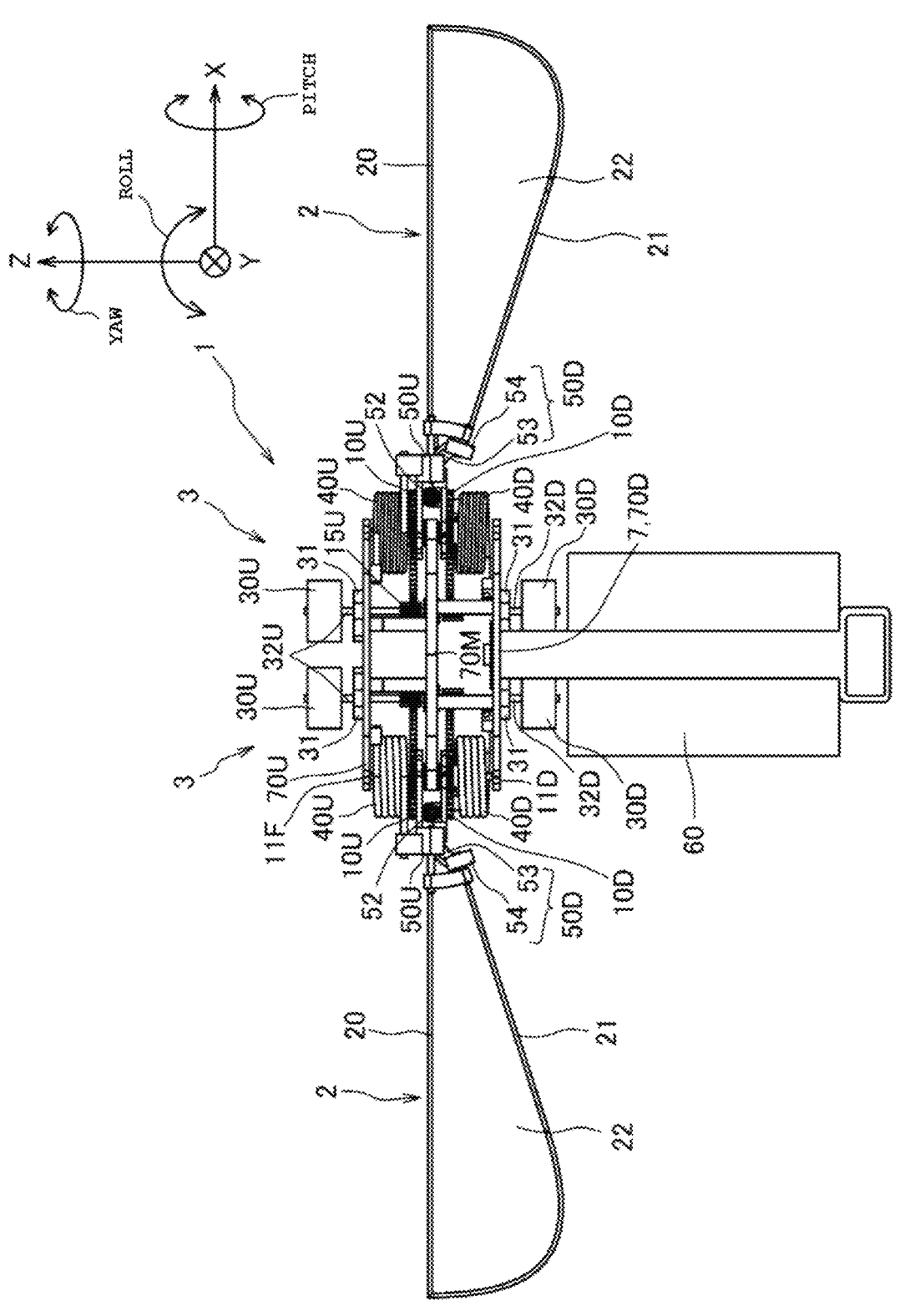
FIG. 2 is a plan view of the flapping device according to the first embodiment of the present invention.

Hereinafter, details of a flapping device 1 according to a first embodiment of the present invention will be described with reference to the attached drawings. These drawings are schematic diagrams and do not necessarily describe sizes in exact proportions. Note that similar reference signs are assigned to similar components in the drawing. As illustrated in FIG. 2, an illustrated vertical direction is set as a Z direction, a rightward/leftward direction is set as an X direction, and an illustrated depth direction is set as a Y direction, and rotation in a direction around a Z axis may be denoted as a yaw direction, rotation in a direction around an X axis may be denoted as a pitch direction, and rotation in a direction around a Y axis may be denoted as a roll direction.

First Embodiment

As illustrated in FIGS. 1 to 5, the flapping device 1 has a pair of blades 2, 2 and a pair of drive units 3, 3 (a total of four drive units 3, 3, 3, 3) disposed for each of the pair of blades 2, 2. Each of the drive units 3, 3, 3, 3 is supported by a body 7. The flapping device 1 according to this embodiment is configured to acquire a lift force toward an upper side by driving the pair of blades 2, 2 to reciprocate in a horizontal direction (a forward/backward direction in the drawing). Since the pair of blades 2, 2 and the four drive units 3, 3, 3, 3 are symmetrically arranged horizontally, in the following description, in a case in which there is no particular need to distinguish between sides, a horizontal one side (a right side) will be described, and description of the other side (a left side) will be omitted. Note that, in FIGS. 1 to 5, an illustrated upper side may be described as an upper side (a U side), and an illustrated lower side may be described as a lower side (a U side).

The body 7 has a pair of support parts 700, 70D disposed spaced apart in a vertical direction and an intermediate support part 70M arranged between the support parts 70U, 70D. In this embodiment, each of the support parts 70U, 70D and the intermediate support part 70M is formed of a plate-shaped member.

The drive units 3, 3 have a first drive source 30U, a second drive source 30D, a first driven part 10U, and a second driven part 10D. The drive units 3, 3 also include a first vibration excitation member 40U, a second vibration excitation member 40D, a control unit 60, and the like. In this embodiment, the first drive source 30U and the second drive source 30D are configured using an outrunner motor in a DC motor. Illustration and description of a power source (battery) for driving the first drive source 30U and the second drive source 30D will be omitted.

The first drive source 30U is supported on an outer face of the support part 70U located on an upper side through a pedestal 31. The second drive source 30D is supported on an outer face of the support part 70D located on a lower side through the pedestal 31. In this embodiment, the second drive source 30D is arranged to be vertically symmetrical with respect to the first drive source 30U through the intermediate support part 70M.

Figure 5:
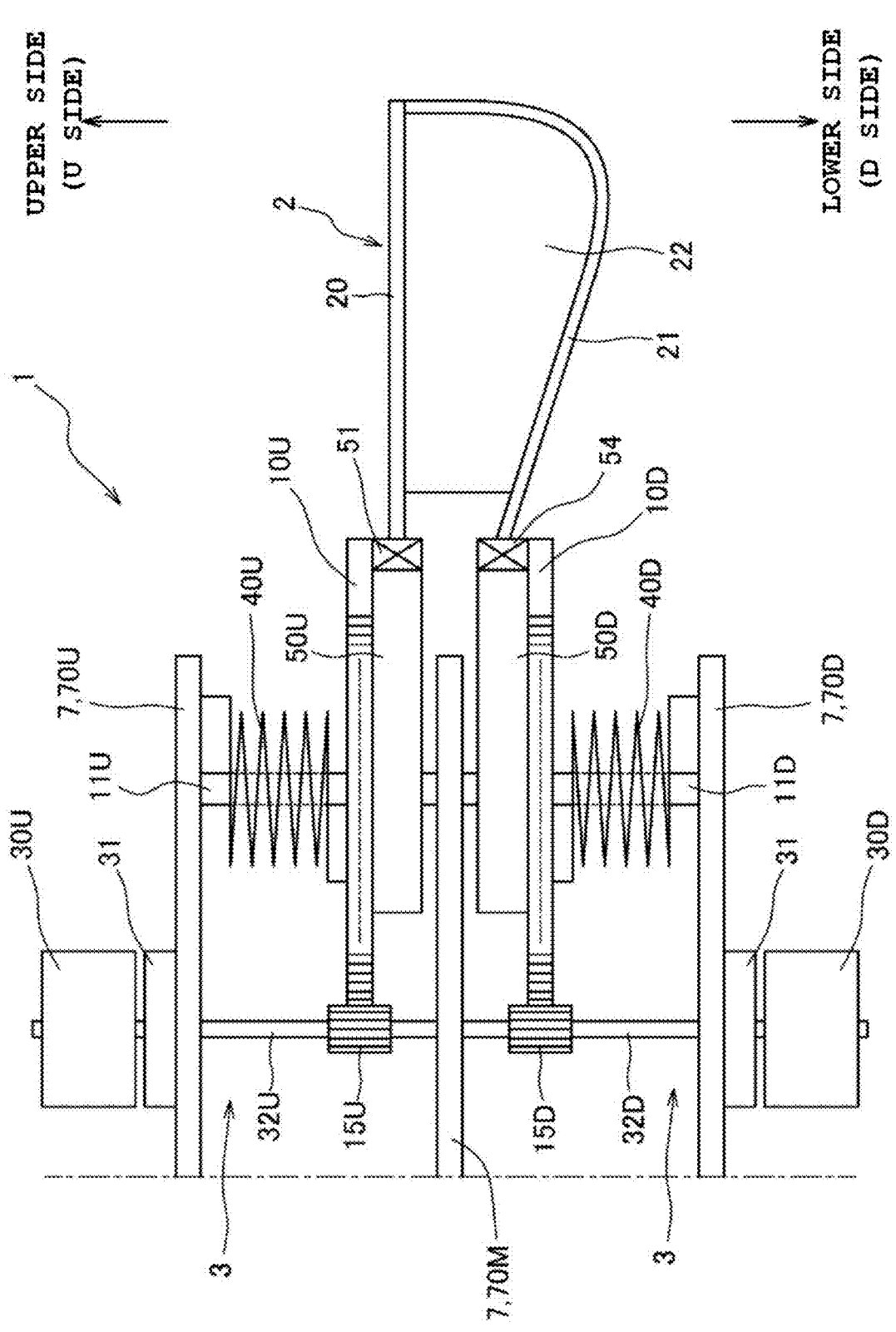
FIG. 5 is a partial cutout schematic configuration diagram of the flapping device according to the first embodiment of the present invention.

As illustrated in FIG. 5, a drive shaft 32U of the first drive source 30U is rotatably supported by the support part 70U through an appropriate bearing (not illustrated in the drawing). In addition, a tip end side of the drive shaft 32U is rotatably supported by the intermediate support part 70M through an appropriate bearing (not illustrated in the drawing). In addition, a first drive gear 15U as a pinion gear is externally fitted in a middle part of the drive shaft 32U.

A drive shaft 32D of the second drive source 30D is rotatably supported by the support part 70D through an appropriate bearing (not illustrated in the drawing). In addition, a tip end side of the drive shaft 32D is rotatably supported by the intermediate support part 70M through an appropriate bearing (not illustrated in the drawing). A second drive gear 15D as a pinion gear is externally fitted in a middle part of the drive shaft 32D.

As illustrated in FIGS. 1 to 5, the first driven part 10U is formed of a spur gear with a partially notched part. The notched part of the first driven part 10U is formed to curb interference with the blades 2 and the like. The first driven part 10U is supported by the support part 70U and the intermediate support part 70M to be rotatable in a direction around an axial line of a first rotation shaft 11U. More specifically, in this embodiment, the first rotation shaft 11U is rotatably supported by the support part 70U and the intermediate support part 70M, and the first driven part 10U is fixed to the first rotation shaft 11U through press fitting or the like. In this embodiment, the first driven part 100 is arranged near the intermediate support part 70M side. The first driven part 10U is engaged with the first drive gear 15U and can rotate in a direction around an axial line of the first rotation shaft 11U (see FIG. 5) (also referred to as a first rotation axial line surrounding direction) by receiving power output from the first drive source 30U.

A first blade shaft holding part 50U for holding a first blade shaft 20 to be described below is supported by the first driven part 10U. The first blade shaft holding part 50U is configured to rotate in the first rotation axial line surrounding direction integrally with the first driven part 10U.

A bearing 51 is supported by the first blade shaft holding part 50U to face a radial-direction outer side of the first driven part 10U. In other words, the bearing 51 is supported by the first driven part 10U in a direction intersecting the first rotation shaft 11U (in this embodiment, an orthogonal direction; hereinafter, also referred to as a third axial line surrounding direction). The first blade shaft 20 to be described below is supported by the bearing 51 such that the bearing 51 can rotate in the third axial line surrounding direction.

The second driven part 10D is formed of a spur gear with a partially notched part. The notched part of the second driven part 10D is formed to curb interference with the blades 2 and the like. The second driven part 10D is supported by the support part 70D and the intermediate support part 70M to be rotatable in a direction around an axial line of a second rotation shaft 11D. More specifically, in this embodiment, the second rotation shaft 11D is rotatably supported by the support part 70D and the intermediate support part 70M, and the second driven part 10D is fixed to the second rotation shaft 11D through press fitting or the like. In this embodiment, the second driven part 10D is arranged near the intermediate support part 70M side. The second driven part 10D is engaged with the second drive gear 15D and can rotate in a direction around an axial line of the second rotation shaft 11D (also referred to as a second rotation axial line surrounding direction) by receiving power output from the second drive source 30D. In other words, the second driven part 10D is arranged to be approximately vertically symmetrical with the first driven part 10U through the intermediate support part 70M.

In addition, a second blade shaft holding part 50D used for holding a second blade shaft 21 to be described below is supported by the second driven part 10D. The second blade shaft holding part 50D is configured to rotate in the second rotation axial line surrounding direction integrally with the second driven part 10D.

Figure 3:
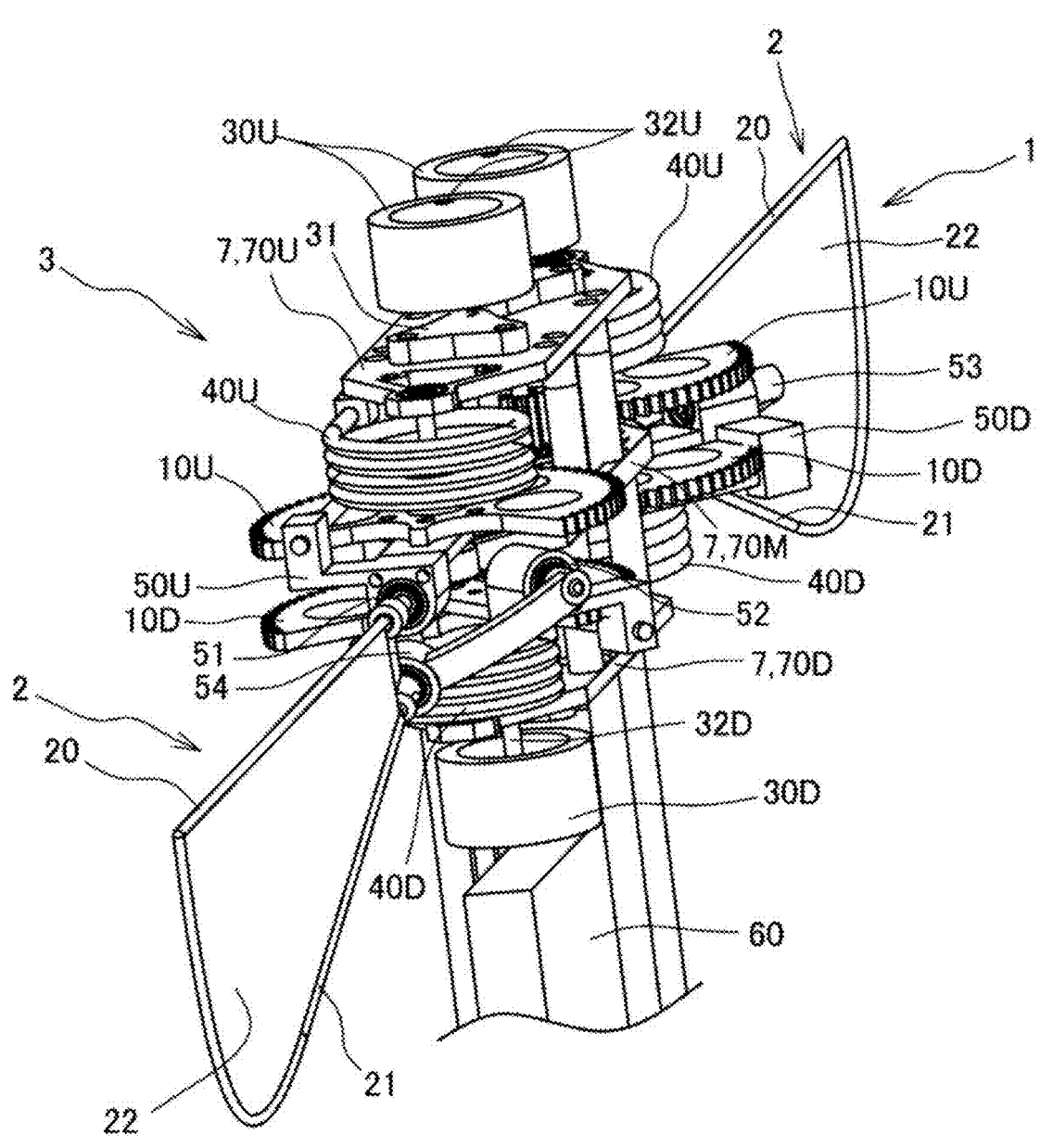
FIG. 3 is a perspective view of the flapping device according to the first embodiment of the present invention that is viewed from an oblique rear side.
Figure 4:
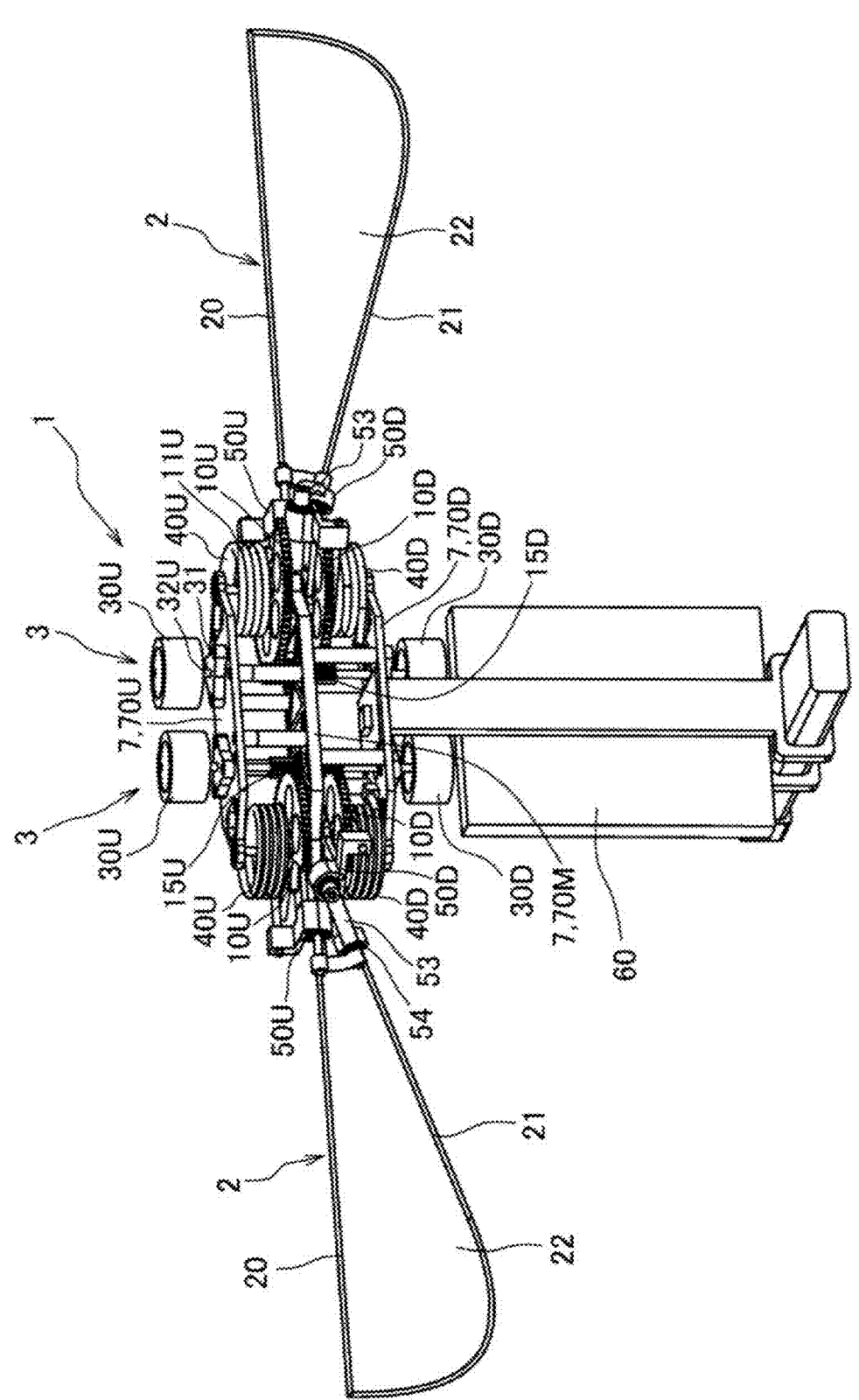
FIG. 4 is a perspective view of the flapping device according to the first embodiment of the present invention that is viewed from a rear side.

As illustrated in FIGS. 3 and 4, a bearing 52 (see FIG. 4) is supported on the second blade shaft holding part 50D such that the bearing 52 faces the outer side of the second driven part 10D. In other words, the bearing 52 is supported while being directed in a direction intersecting the second rotation shaft 11D (in this embodiment, a radial direction of the second rotation shaft 11D; hereinafter also referred to as a fifth axial line surrounding direction). A link member 53 is supported on the bearing 52 such that the link member 53 can be rotated in the fifth axial line surrounding direction.

The link member 53 is formed such that the other end side extends toward the second blade shaft 21 to be described below. A bearing 54 is supported on the other end side of the link member 53 toward the fourth axial line direction. The second blade shaft 21 to be described below is supported on the bearing 54 such that the second blade shaft 21 can rotate in the fourth axial line surrounding direction.

As illustrated in FIGS. 1 to 5, the first vibration excitation member 40U is formed of a torsion spring and is arranged between the support part 70U and the first driven part 10U. The first vibration excitation member 40U is arranged around the axial line of the first rotation shaft 11U. The first vibration excitation member 40U is configured to apply a biasing force to the first driven part 10U in a direction opposite to the rotation direction of the first driven part 10U in accordance with the rotation of the first driven part 10U. More specifically, the first vibration excitation member 40U has one end side (a front end side) being connected to the support part 70U and the other end side (a rear end side) being connected to the first driven part 10U. Therefore, the first vibration excitation member 40U can apply a biasing force in the direction opposite to the rotation direction of the first driven part 10U in accordance with the rotation of the first driven part 10U.

Similar to the first vibration excitation member 40U, the second vibration excitation member 40D is formed of a torsion spring and is arranged between the support part 70D and the second driven part 10D. The second vibration excitation member 40D is arranged around the axial line of the second rotation shaft 11D. The second vibration excitation member 40D is configured to apply a biasing force to the second driven part 10D in a direction opposite to the rotation direction of the second driven part 10D in accordance with the rotation of the second driven part 10D. More specifically, the second vibration excitation member 40D has one end side (a front end side) being connected to the support part 70D and the other end side (a rear end side) being connected to the second driven part 10D. Therefore, the second vibration excitation member 40D can apply a biasing force in the direction opposite to the rotation direction of the first driven part 10U in accordance with the rotation of the second driven part 10D.

The blade 2 has a first blade shaft 20, a second blade shaft 21, a blade main body 22, and the like.

The first blade shaft 20 is formed to extend in a predetermined axial line direction (in this embodiment, in the radial direction of the first rotation shaft 11U). The first blade shaft 20 is connected to the first driven part 10U on the one end side and is rotatably connected in the third rotation axial line surrounding direction intersecting the axial line of the first rotation shaft 11U. More specifically, the first blade shaft 20 is rotatably supported on the bearing 51 of the first blade shaft holding part 50U on the one end side. In addition, a biasing force according to the first vibration excitation member 40U is applied to the first blade shaft 20 in a direction opposite to the rotation direction in accordance with the rotation of the first driven part 10U. In accordance with this, the first blade shaft 20 is excited in the rotation direction of the first driven part 10U (the first rotation axial line surrounding direction).

The second blade shaft 21 is formed to extend in a predetermined axial line direction (in this embodiment, a direction inclined at a predetermined inclination angle with respect to the first blade shaft 20). The second blade shaft 21 is connected to the second driven part 10D on the one end side and is connected to be rotatable in a fourth rotation axial line surrounding direction intersecting the axial line of the second rotation shaft 11D. More specifically, the second blade shaft 21 is rotatably supported on the bearing 54 of the link member 53 on the one end side. In other words, the second blade shaft 21 is rotatably connected to the second driven part 10D in the fourth rotation axial line surrounding direction through the link member 53 in the second blade shaft holding part 50D.

In accordance with this, even in a case in which the second blade shaft 21 is inclined with respect to the first blade shaft 20 (for example, in a case in which the blade 2 is formed in a fan shape), the flapping device 1 described above can reliably support the second blade shaft 21 to be rotatable along the direction of inclination (the fourth rotation axial line direction). In accordance with this, the degree of freedom in design and the aerodynamic characteristics of the blade 2 can be expected to be improved.

In addition, a biasing force according to the second vibration excitation member 40D is applied to the second blade shaft 21 in a direction opposite to the rotation direction in accordance with the rotation of the second driven part 10D. In accordance with this, the second blade shaft 21 is excited in the rotation direction of the second driven part 10D (the second rotation axial line surrounding direction).

The blade main body 22 is disposed over the first blade shaft 20 and second blade shaft 21. In this embodiment, the blade main body 22 is formed in an approximate fan shape. The blade main body 22 oscillates to reciprocate by driving the first drive source 30U and the second drive source 30D, thereby being able to generate a lift force.

The control unit 60 is configured to perform output control of driving forces according to the first drive source 30U and the second drive source 30D. In other words, by performing output control of driving forces according to the first drive source 30U and the second drive source 30D, a reciprocating motion is given to the blade 2.

Figure 6:
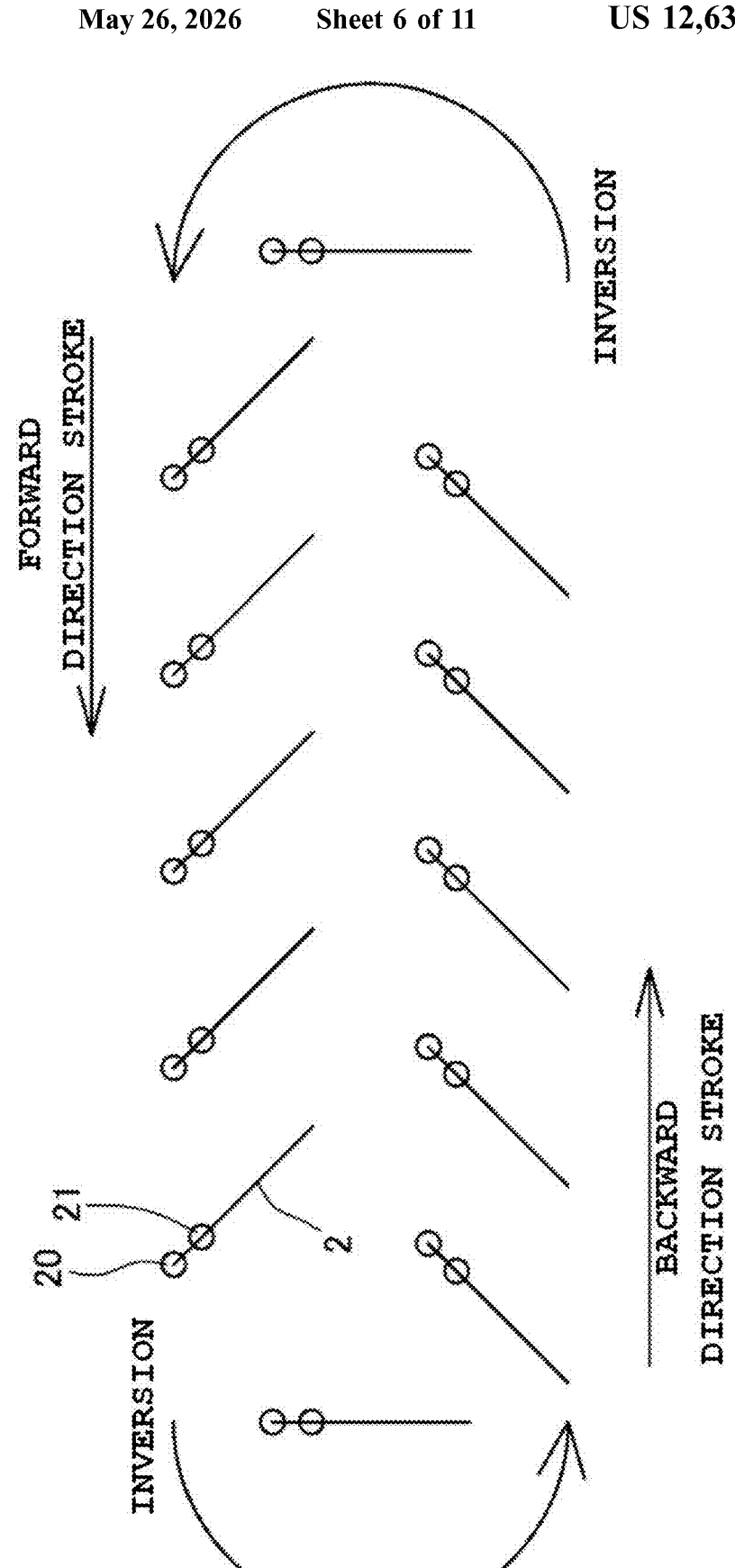
FIG. 6 is an explanatory diagram of drive of blades configuring the flapping device according to the first embodiment of the present invention.

FIG. 6 is an explanatory diagram illustrating the movement of the blade 2 of a case in which the control unit 60 performs control such that there is a predetermined amount of difference between the phase of the output of the first drive source 30U and the phase of the output of the second drive source 30D. In the example illustrated in FIG. 6, for example, the phase of the output of the first drive source 300 is shifted by 3% such that it leads the phase of the output of the second drive source 30D. In this way, by configuring a difference between phases of the first drive source 30U and the second drive source 30D (both are also referred to as drive sources 30, 30 altogether), the blade 2 is inclined by a predetermined angle (for example 30 degrees) in a direction opposite to the direction of travel. More specifically, as illustrated in the drawing, for example, in a case in which the blade 2 is stroked forward, the blade 2 is inclined toward the rear side by a predetermined angle. In addition, for example, in a case in which the blade 2 is stroked backward, the blade 2 is inclined toward the front side by a predetermined angle. In other words, by configuring a difference in phase between the amplitudes of the first blade shaft 20 and the second blade shaft 21, the blade 2 is inclined by a predetermined angle in a direction opposite to the direction of travel. In accordance with this, the flapping device 1 described above can efficiently generate a lift force. The inclination angle of the blade 2 may be changed appropriately in accordance with a flight mode.

Here, the control unit 60, for example, by controlling the output of the drive source 30 to increase/decrease the amplitudes of the pair of blades 2, 2 to be the same, can increase or decrease the lift force. In addition, for example, by controlling the outputs of the drive sources 30, 30 such that there is a difference between the amplitudes of the one pair of blades 2, 2, the control unit 60 can generate a torque (a driving force) in the roll direction in accordance with a difference between right and left lift forces.

In addition, the control unit 60 is configured to be able to execute first offset control for offsetting the amplitude center of the first vibration excitation member 40U by a predetermined amount to one side or the other side around the first rotation axial line and second offset control for offsetting the amplitude center of the second vibration excitation member 40D by a predetermined amount to one side or the other side around the second rotation axial line.

Figure 8A:
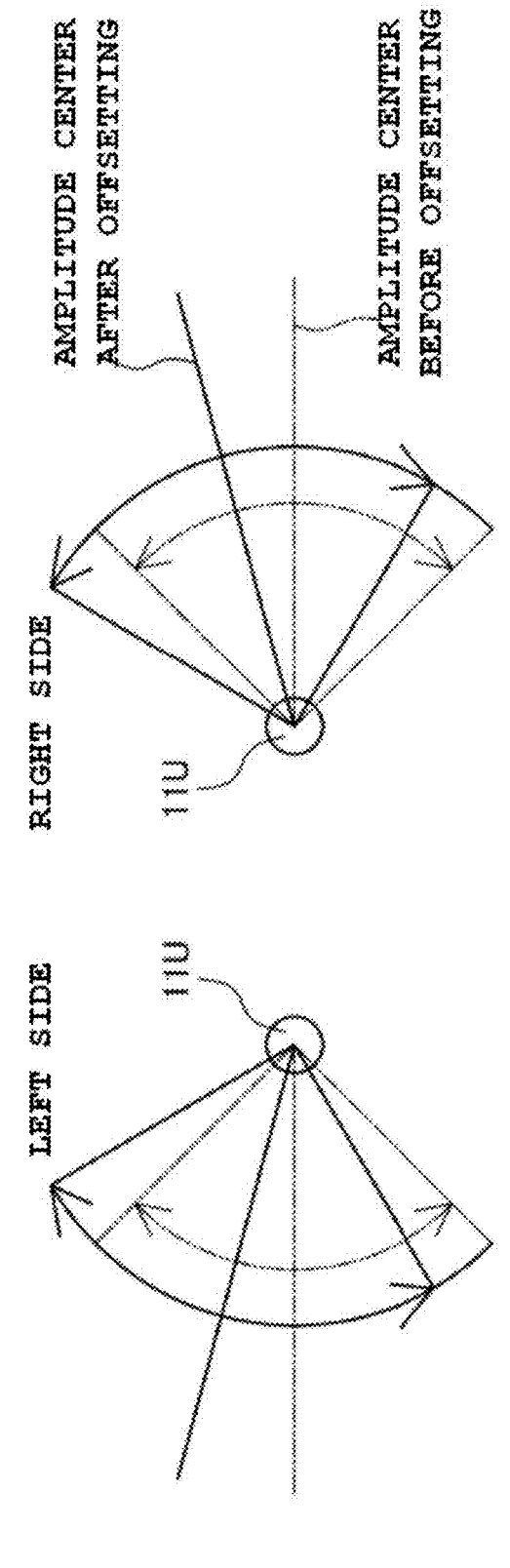
FIG. 8A is an explanatory diagram of a case in which the amplitude center is offset.

FIG. 8A is an explanatory diagram of a case in which the amplitude center of the vibration excitation member 40 is offset. Note that, in FIG. 8A, an angle by which the amplitude center of the vibration excitation member 40 is offset is drawn in an exaggerated manner for ease of understanding. In the first offset control and the second offset control described above, the amplitude center of any one or both of the first vibration excitation member 40U and the second vibration excitation member 40D is configured to be offset in a forward/backward direction (in this embodiment, a solid line position on the front side). In other words, in the first offset control and the second offset control described above, the center of the lift force is configured to be biased in the forward/backward direction (in this embodiment, to the front side).

Figure 8B:
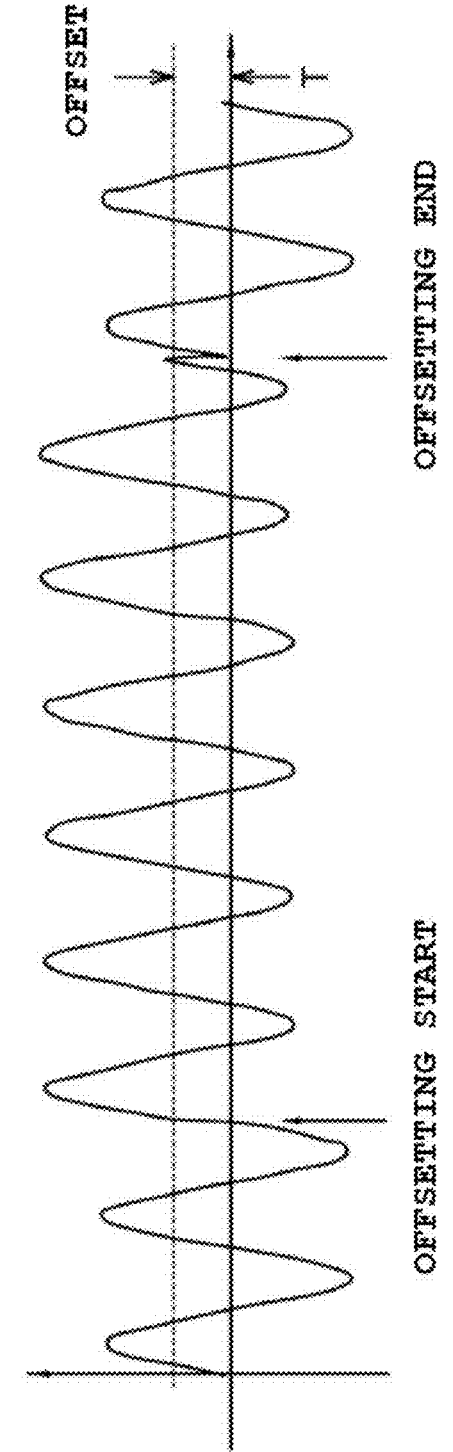
FIG. 8B is an explanatory diagram of offset control in the flapping device according to the first embodiment of the present invention.

More specifically, as illustrated in FIG. 8B, the first offset control and the second offset control can be executed by applying a predetermined amount T of offset to a drive voltage waveform (also referred to as an output waveform) of any one or both of the first drive source 30U and the second drive source 30D. The application of an offset to a drive voltage waveform can be executed, for example, by configuring a difference between the output of the drive voltage for a forward direction and the output of the drive voltage for a backward direction. In other words, the amplitude center of the vibration excitation member 40 is offset (see FIG. 8A). In accordance with this, the control unit 60 can generate a torque in a pitch direction. Here, the angle by which the amplitude center of the vibration excitation member 40 is offset, for example, may be 5 to 10 degrees. In the flapping device 1 according to the first embodiment, in a case in which the offset described above is applied, it is necessary to increase the output of the drive sources 30, 30 against the vibration excitation members 40, 40. Depending on the flight mode of the flapping device 1, the offset amounts of the first drive source 30U and the second drive source 30D may be the same or different from each other.

In addition, the control unit 60 can generate a torque in a yaw direction, for example, by controlling the outputs of the drive sources 30, 30 such that there is a difference in speeds in the forward and backward directions in a reciprocating motion and by controlling the outputs of the drive sources 30, 30 such that differences in speeds between the right and left blades 2, 2 are in opposite directions.

Figure 7:
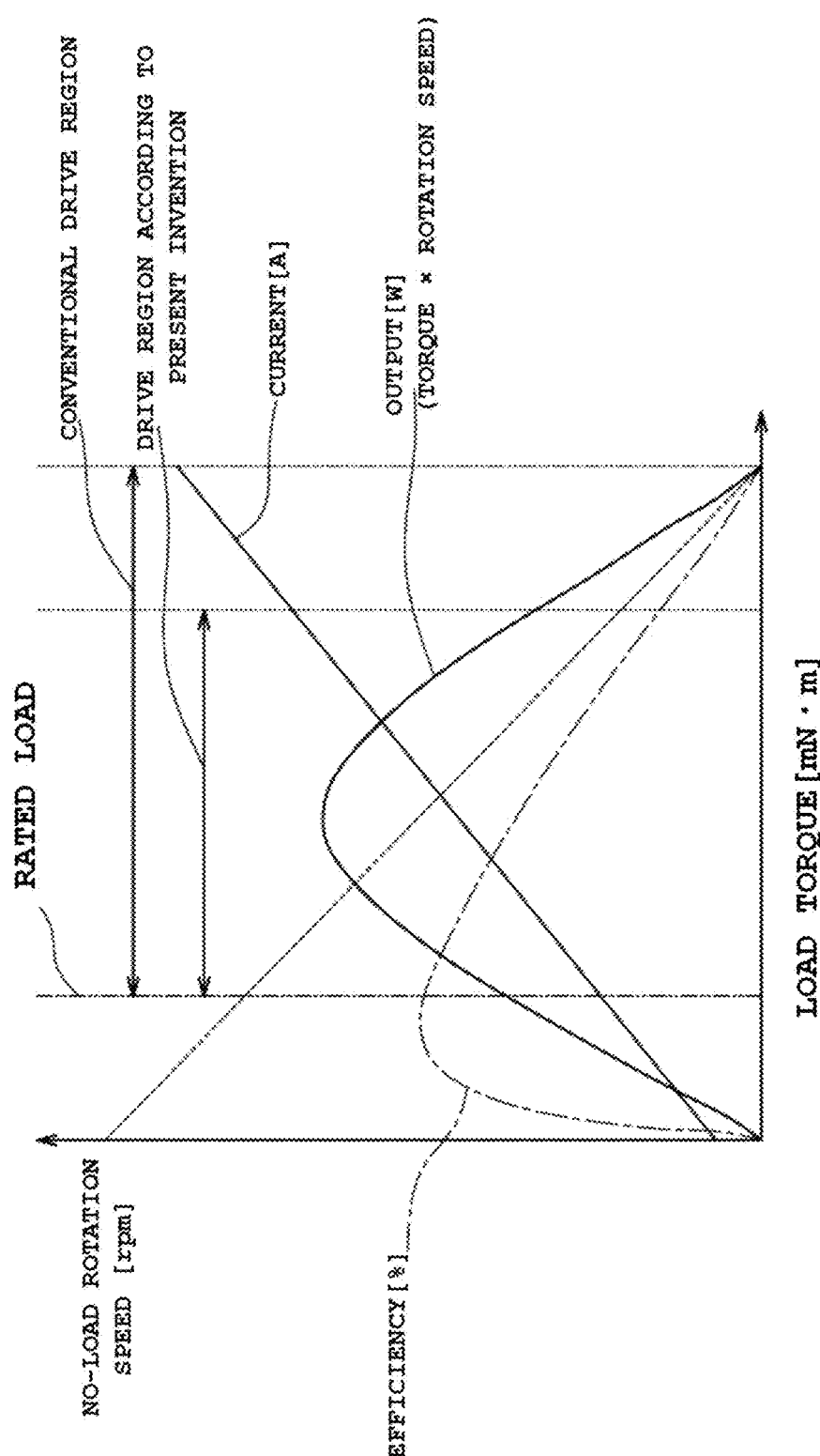
FIG. 7 is an explanatory diagram of output characteristics of a motor used in the flapping device according to the first embodiment of the present invention and an output region of the motor.

FIG. 7 is an explanatory diagram of output characteristics of the drive source 30 and an output region used by the flapping device 1 according to the present invention. As illustrated in the drawing, in a case in which a motor (in this embodiment, an outrunner motor) is used as the drive source 30, the electrical and mechanical conversion efficiency of the drive source 30 tends to decrease at the time of turnaround (switching between forward movement and backward movement) in the reciprocating motion of the blade 2. In the flapping device 1 described above, in accordance with restoring forces of the first vibration excitation member 40U and the second vibration excitation member 40D, autonomous switching of the reciprocating motion is performed at a turnaround end in the reciprocating motion of the blade 2.

Thus, in this embodiment, the control unit 60 performs control of stopping the output of driving forces of the first drive source 30U and the second drive source 30D before a predetermined time at which the rotation speeds of the first drive source 30U and the second drive source 30D become zero in switching between forward rotation or reverse rotation of the first drive source 30U and the second drive source 30D. Here, the predetermined time described above can be arbitrarily set in accordance with the characteristics (for example, the efficiency of output) of the first drive source 30U and the second drive source 30D that are used. Together therewith, the control unit 60 is configured to perform control of resuming the output of the driving forces according to the first drive source 30U and the second drive source 30D at a time point at which the forward movement or the backward movement is switched in the blade 2 in accordance with restoring forces of the first vibration excitation member 40U and the second vibration excitation member 40D.

In accordance with these, the drive according to the drive source 30 can stop in a part in which the efficiency of the drive source 30 decreases, and thus waste from the output of the drive source 30 can be reduced, and the improvement of the electric cost of the drive battery can be expected. In this way, the flapping device 1 described above can efficiently move the blades 2 back and forth. The flapping device 1 described above is configured to perform control of resuming the drive of the drive source 30 at a time point at which the forward movement or the backward movement is switched in the pair of the blades 2, 2 in accordance with the restoring forces of the first vibration excitation member 40U and the second vibration excitation member 40D. In accordance with this, the flapping device 1 described above can excite the blades 2 in regions near the flap center in which the angular velocity of the blades 2 is high. In addition, the flapping device 1 described above can efficiently perform a flapping motion without increasing the capacity of the drive source 30. For this reason, downsizing of the flapping device 1 described above can be expected.

The configuration of the flapping device 1 according to the first embodiment of the present invention has been described as above. In the description presented above, the configurations of parts that are horizontally symmetrically arranged are similar to each other, and thus description thereof is omitted. Next, operations and effects of the flapping device 1 according to one embodiment of the present invention are described below.

In the flapping device 1 described above, the first blade shaft 20 is driven by the first drive source 30U, and the second blade shaft 21 is driven by the second drive source 30D. In other words, the blades 2 are driven by both the first drive source 30U and the second drive source 30D, and the stroke angle of blades 2 according to the rotation angle of the first drive source 30U is defined as the angle of attack of the blades 2 in accordance with a difference between the rotation angles of the first drive source 30U and the second drive source 30D. In accordance with this, the flapping device 1 described above can individually control the stroke and the angle of attack, and thus flight with higher mobility such as moving in a horizontal direction with the attitude maintained can be performed.

In addition, the flapping device 1 described above can excite the first blade shaft 20 and the second blade shaft 21 in the first rotation axial line surrounding direction and the second rotation axial line surrounding direction using biasing using the first vibration excitation member 40U and the second vibration excitation member 40D (both are also referred to as vibration excitation members 40 altogether). Thus, the flapping device 1 described above can amplify the flapping frequency of one pair of blades 2, 2 through excitation and thus can drive the pair of blades 2, 2 at high speed.

In this embodiment, in the flapping device 1 described above, the first drive source 30U and the second drive source 30D are configured using outrunner motors as DC motors. For this reason, the flapping device 1 described above can increase the inertia according to a rotor that constitutes the motor. In accordance with this, the flapping device 1 described above can reduce a change in the resonance frequency of the resonance system and a change in the blade amplitude, and thus the control is stabilized. Therefore, the flapping device 1 described above can reduce the influence of disturbances (for example, an air current) received by the flapping device 1, and further stabilization of the control can be expected.

In addition, the flapping device 1 described above can reduce the cost of the first drive source 30U and the second drive source 30D by using outrunner motors that are less expensive than in-runner motors. Therefore, by substituting four units of one pair of right and left first drive sources 30U, 30U and one pair of right and left second drive sources 30D, 30D with outrunner motors, the flapping device 1 described above can be expected to further reduce costs.

The flapping device 1 described above has the body 7 supporting one pair of drive units 3, 3, and the body 7 has a pair of support parts 70U, 70D that are arranged to be spaced apart. In addition, the first drive source 30U and the second drive source 30D are arranged outside the pair of support parts 70U, 70D, and the first vibration excitation member 40U, the second vibration excitation member 40D, the first driven part 10U, and the second driven part 10D are arranged between the pair of support parts 70U, 70D.

In accordance with this, in the flapping device 1 described above, the drive source 30, the first vibration excitation member 40U, the second vibration excitation member 40D, the first driven part 10U, and the second driven part 10D do not interfere with each other. For this reason, the flapping device 1 described above can curb the rotor of the outrunner motor from interfering with the first vibration excitation member 40U, the second vibration excitation member 40D, the first driven part 10U, and the second driven part 10D, for example, in a case in which an outrunner motor is used as the drive source 30. In this way, the flapping device 1 described above can curb an increase in the size of the device even in a case in which the rotor is exposed as in the case of an outrunner motor.

The configuration and the operations and the effects of the flapping device 1 according to the first embodiment of the present invention have been described above, and, next, details of a flapping device 100 according to a second embodiment of the present invention are described. The configuration of the flapping device 100 according to the second embodiment is similar to that of the flapping device 1 described above except that the way the first vibration excitation member 40U and the second vibration excitation member 40D are connected and the arrangement of each component is partially different, and thus, description of similar parts is omitted. Note that the same reference signs are used for the same members as those of the flapping device 1 described above. In addition, since the flapping device 100 is horizontally symmetrically configured, one side will be described, and description of the other side will be omitted.

In the flapping device 1 according to the first embodiment described above, one end side of the vibration excitation members 40, 40 is connected to the support parts 70U, 70D, and the other side is connected to the first driven part 10U or the second driven part 10D. Here, in order to increase the flapping frequency of the flapping device 1 for reducing the effect of disturbances, for example, the spring constant of torsion springs or the like used in the vibration excitation members 40, 40 may be considered to be increased. However, in a case in which the spring constant of the vibration excitation members 40, 40 is raised, the restoring force also becomes stronger, resulting in a larger load, and there is concern that it would become difficult to stroke the first blade shaft 20 and the second blade shaft 21. As a result, there is concern that the lift force would be reduced. Thus, an object of the second embodiment is to provide a flapping device 100 that can further improve the lift force and stabilize control by curbing the concerns relating to the first embodiment.

Second Embodiment

Figure 9:
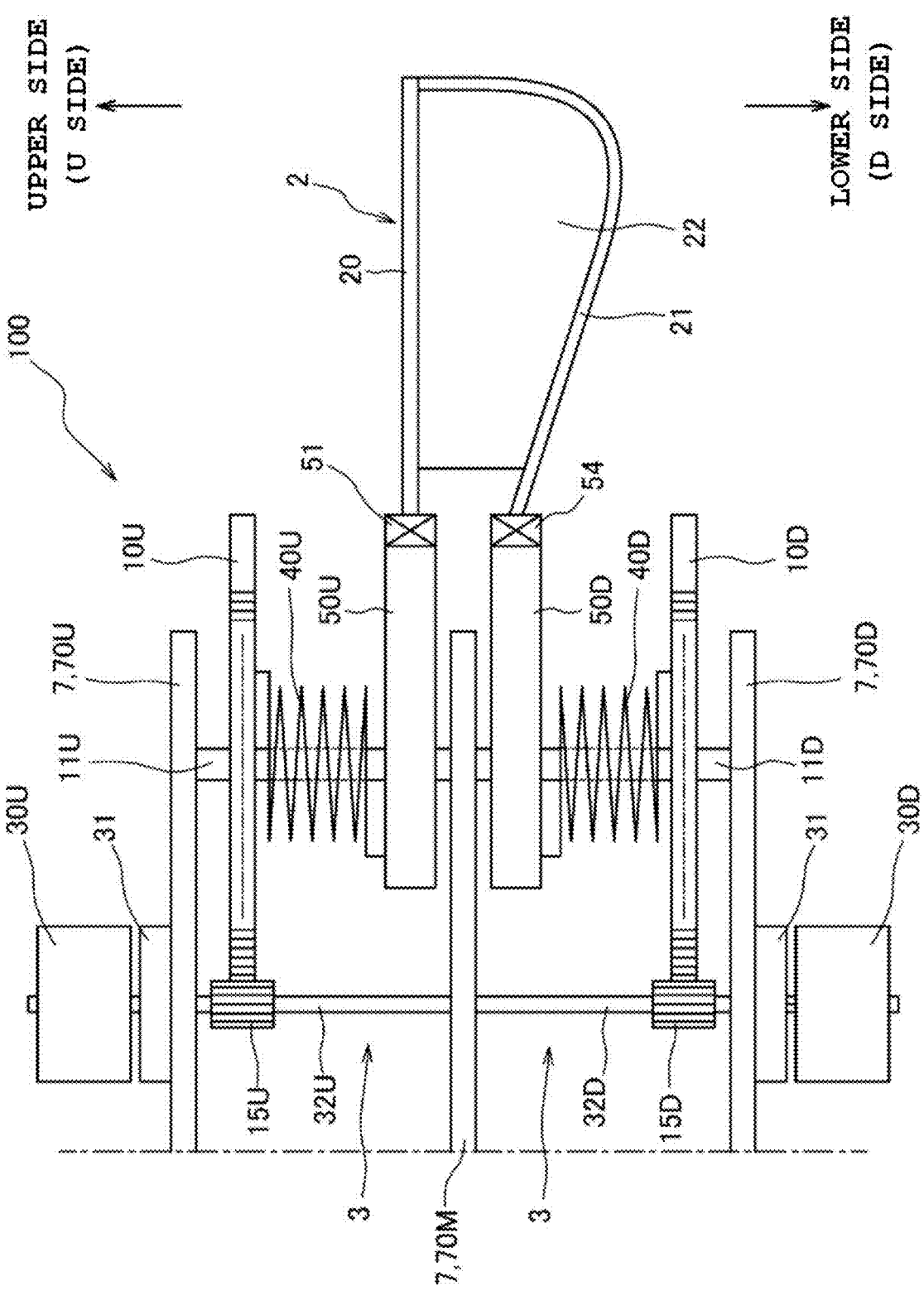
FIG. 9 is a partial cutout schematic configuration diagram of a flapping device according to a second embodiment of the present invention.

As illustrated in FIG. 9, the flapping device 100 according to the second embodiment has a pair of blades 2, 2 and a pair of drive units 3, 3 disposed in correspondence with the pair of blades 2, 2. The drive unit 3 includes a first drive source 30U, a second drive source 30D, a first driven part 10U, and a second driven part 10D. In addition, other than those described above, the drive unit 3 includes a first vibration excitation member 40U, a second vibration excitation member 40D, a control unit 60 that controls the output of the driving force according to the first drive source 30U and the second drive source 30D, and the like.

The first vibration excitation member 40U of the flapping device 100 has one end side being connected to the first driven part 10U and the other end side being directly or indirectly connected to a first blade shaft 20. More specifically, the first vibration excitation member 40U has one end side being connected to the first driven part 10U and the other end side being connected to a first blade shaft holding part 50U.

The second vibration excitation member 40D has one end side being connected to the second driven part 10D and the other end side being directly or indirectly connected to a second blade shaft 21. More specifically, the second vibration excitation member 40D has one end side being connected to the second driven part 10D and the other end side being connected to a second blade shaft holding part 50D. In other words, the first vibration excitation member 40U and the second vibration excitation member 40D (both are also referred to as vibration excitation members 40, 40 altogether) have one end sides not being fixed to a body 7 that constitutes the flapping device 100 but being fixed to the first driven part 10U and the second driven part 10D. In other words, one end sides of the vibration excitation members 40, 40 form free ends. In the second embodiment, the first driven part 100 is rotatably supported with respect to a first rotation shaft 11U, and the second driven part 10D is rotatably supported with respect to a second rotation shaft 11D.

The configuration of the flapping device 100 according to the second embodiment of the present invention has been described as above, and, similar to the first embodiment, the flapping device 100 can offset the amplitude center of the vibration excitation members 40, 40. In other words, the flapping device 100 according to the second embodiment can execute the first offset control and the second offset control described above.

Figure 10:
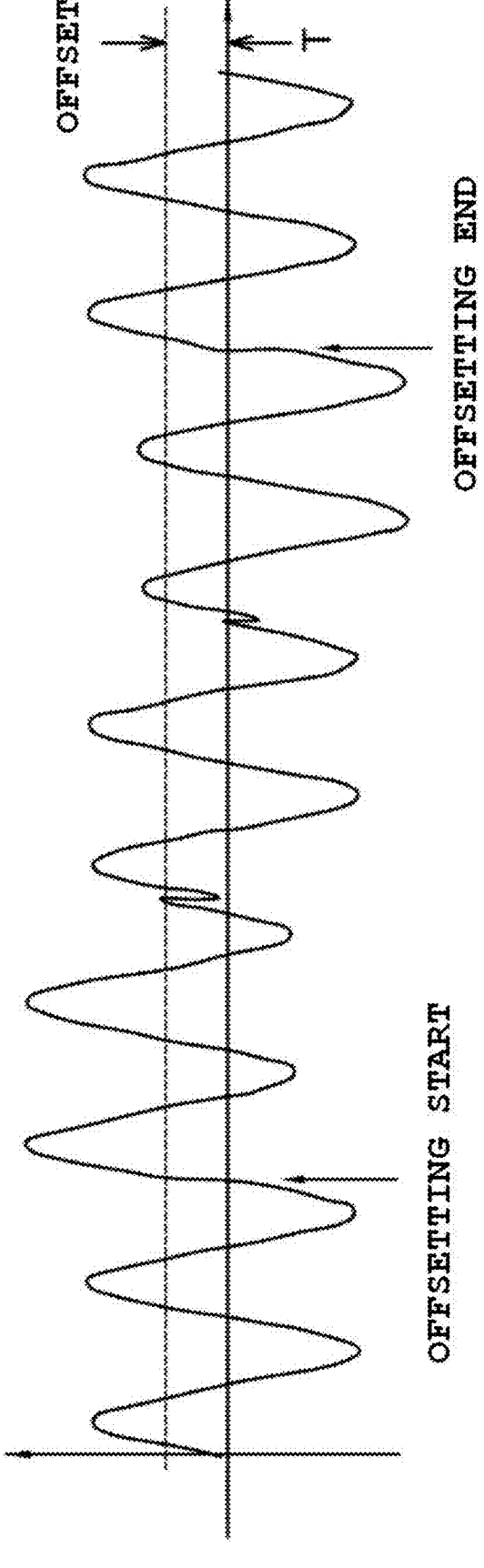
FIG. 10 is an explanatory diagram of offset control in the flapping device according to the second embodiment of the present invention.

As illustrated in FIG. 10, the first offset control and the second offset control can be executed by applying a predetermined amount T of offset to a drive voltage waveform (an output waveform) of any one or both of the first drive source 30U and the second drive source 30D. Depending on the flight mode of the flapping device 100, the offset amounts of the first drive source 30U and the second drive source 30D may be the same or different from each other.

In this way, by applying a predetermined amount T of offset of to the drive voltage waveforms of the first drive source 30U and the second drive source 30D, the flapping device 100 described above can easily execute the first offset control and the second offset control. For this reason, according to the flapping device 100 described above, stabilization of control can be expected while performing high-precision control. In addition, in the flapping device 100 according to the second embodiment, one end side of the vibration excitation members 40, 40 forms a free end. Thus, as illustrated in FIG. 10, an offset can be easily applied to the drive voltage waveforms of the drive sources 30, 30. In other words, an offset can be easily applied to the drive voltage waveform (the drive voltage waveform can be relatively offset) without depending on the restoring forces of the vibration excitation members 40, 40.

The configuration of the flapping device 100 according to the second embodiment of the present invention has been described as above, and, next, details of operations and effects of the flapping device 100 are described.

As described above, the flapping device 100 can excite the first blade shaft 20 and the second blade shaft 21 without being affected by the restoring forces of the vibration excitation members 40, 40 even in a case in which a torque (a biasing force) is applied to the vibration excitation members 40, 40. In other words, the flapping device 100 described above can directly apply a torque to the first blade shaft 20 and the second blade shaft 21. In accordance with this, stabilization of the output control of the drive sources 30, 30 can be expected. For example, a torsion spring or the like capable of biasing a torque in a torsional direction can preferably be used for the vibration excitation members 40, 40 described above.

In the flapping device 100 described above, one end sides of the vibration excitation members 40, 40 are formed as free ends, and thus, even if the spring constant of the vibration excitation members 40, 40 is raised, it is difficult to receive influences according to the restoring forces of the vibration excitation members 40, 40. Thus, according to the flapping device 100 described above, since the flapping frequency can be improved by raising the spring constants of the vibration excitation members 40, 40, stabilization of the output control of the drive sources 30, 30 can be expected. In addition, since the weight of the vibration excitation members 40, 40 can be increased in accordance with the improvement of the spring constants of the vibration excitation members 40, 40, a further reduction in the influence of disturbances can be expected.

In the flapping device 100 described above, the first blade shaft 20 is driven by the first drive source 30U, the second blade shaft 21 is driven by the second drive source 30D, and the stroke angle of the blades 2 according to the rotation angle of the first drive source 30U is defined as the angle of attack of the blades 2 in accordance with a difference between the rotation angles of the first drive source 30U and the second drive source 30D. In accordance with this, the flapping device 100 described above can individually control the stroke and the angle of attack, and thus flight with higher mobility such as moving in a horizontal direction with the attitude maintained can be performed.

Since the flapping device 100 described above can independently perform drive control of the first drive source 30U and the second drive source 30D, flight in various directions can be performed. Here, although various motors and the like can be used as the first drive source 30U and the second drive source 30D (both are also simply referred to as drive sources 30, 30 altogether), brushless DC motors that can be easily rotated in forward and reverse directions and have a high power-to-weight ratio can preferably be used. In accordance with this, battery driving can be easily performed, and the control can be easily performed as well.

Figure 11:
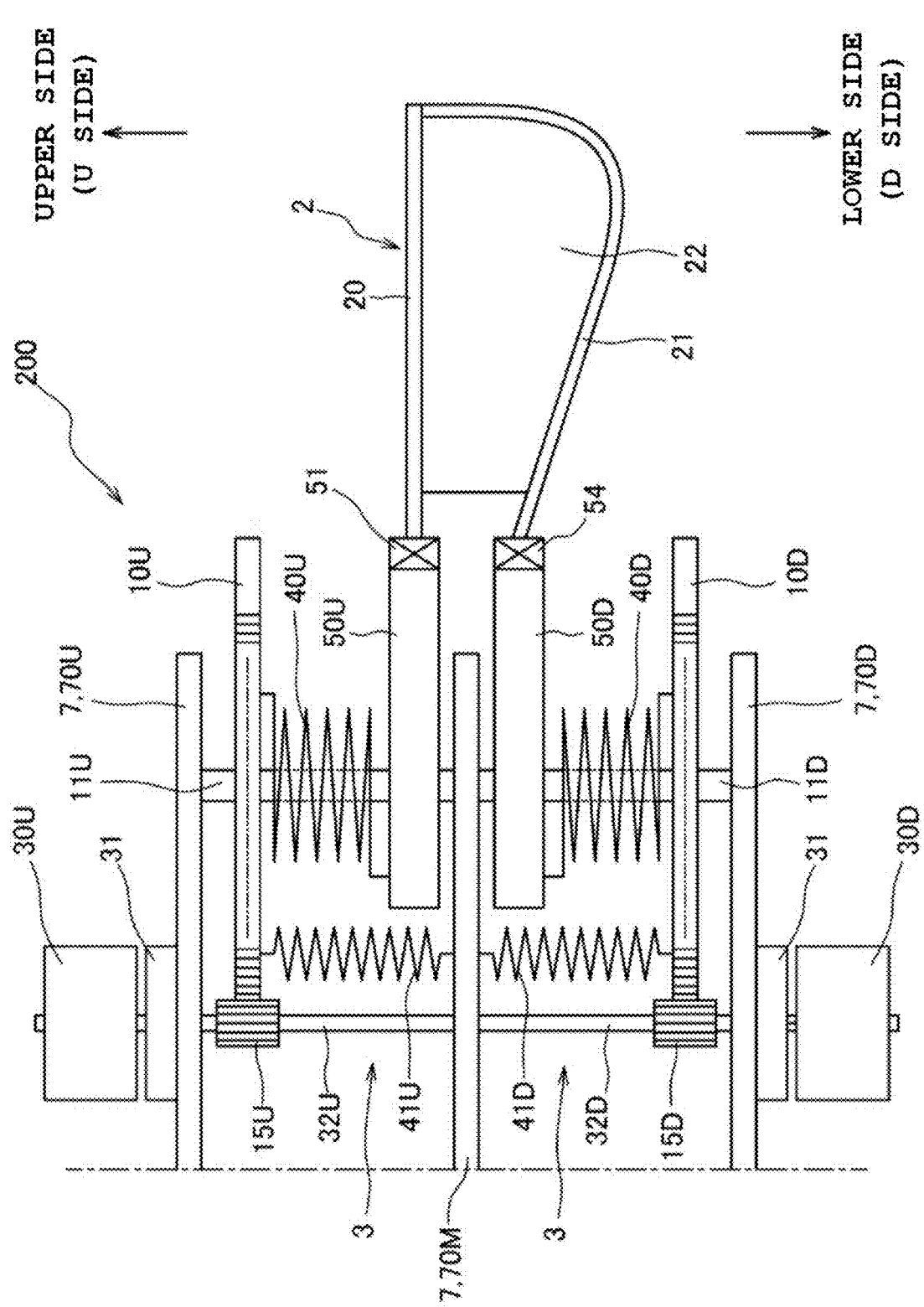
FIG. 11 is a partial cutout schematic configuration diagram of a flapping device according to a third embodiment of the present invention.

Here, in the first offset control and the second offset control described above, one end side of the vibration excitation members 40, 40 is formed as a free end. For this reason, there is a concern that the amplitude center of the vibration excitation members 40, 40 after offsetting would deviate from the scheduled amplitude center (also referred to as a reference position) in accordance with the excitation of the vibration excitation members 40, 40. Thus, as illustrated in FIG. 11, in a flapping device 200 according to a third embodiment, a third vibration excitation member 41U and a fourth vibration excitation members 41D are further disposed, and the amplitude centers of the vibration excitation members 40, 40 after offsetting are returned to the reference position. Hereinafter, details of the flapping device 200 according to the third embodiment are described. Since the flapping device 200 according to the third embodiment is acquired by disposing the third vibration excitation member 41U and the fourth vibration excitation member 41D in the flapping device 100 according to the second embodiment, description of parts similar to those of the flapping device 100 according to the second embodiment is omitted. Since the flapping device 200 according to the third embodiment is horizontally symmetrically configured, one side will be described and description of the other side will be omitted.

Third Embodiment

As illustrated in FIG. 11, the flapping device 200 according to the third embodiment has the third vibration excitation member 41U and the fourth vibration excitation member 41D in addition to the configuration of the flapping device 100 (see FIG. 9) according to the second embodiment.

As the third vibration excitation member 41U, for example, a torsion spring is used. The third vibration excitation member 41U is configured to apply a biasing force to a first driven part 10U in a direction opposite to the rotation direction of the first driven part 10U in accordance with the rotation of the first driven part 10U. More specifically, the third vibration excitation member 41U is connected to a body 7 (in this embodiment, an intermediate support part 70M) on one end side and is connected to the first driven part 10U on the other end side.

The third vibration excitation member 41U is capable of exerting a biasing force that is smaller than a biasing force of the first vibration excitation member 40U and is capable of exerting a biasing force that can return the amplitude center of the first vibration excitation member 40U to the reference position. For example, a torsion spring with a smaller spring coefficient than that of the first vibration excitation member 40U is used as the third vibration excitation member 41U. For this reason, the influence of the third vibration excitation member 41U on the first vibration excitation member 40U is limited.

Here, as the spring coefficient of the third vibration excitation member 41U, various spring coefficients that can exert a biasing force capable of returning the amplitude center of the first vibration excitation member 40U to the reference position can be used. The spring coefficient of the third vibration excitation member 41U may be determined by considering the balance between the effect on the first vibration excitation member 40U and the biasing force to return the amplitude center to the reference position.

As the fourth vibration excitation member 41D, for example, a torsion spring is used. The fourth vibration excitation member 41D is configured to apply a biasing force to a second driven part 10D in a direction opposite to the rotation direction of the second driven part 10D in accordance with the rotation of the second driven part 10D. More specifically, the fourth vibration excitation member 41D is connected to the body 7 (in this embodiment, the intermediate support part 70M) on the one end side and is connected to the second driven part 10D on the other end side.

The fourth vibration excitation member 41D is capable of exerting a biasing force that is smaller than a biasing force of the second vibration excitation member 40D and is capable of exerting a biasing force that can return the amplitude center of the second vibration excitation member 40D to the reference position. For example, a torsion spring with a smaller spring coefficient than that of the second vibration excitation member 40D is used as the fourth vibration excitation member 41D. For this reason, the influence of the fourth vibration excitation member 41D on the second vibration excitation member 40D is limited.

Here, as the spring coefficient of the fourth vibration excitation member 41D, various spring coefficients that can exert a biasing force capable of returning the amplitude center of the second vibration excitation member 40D to the reference position can be used. The spring coefficient of the fourth vibration excitation member 41D may be determined by considering the balance between the effect on the second vibration excitation member 40D and the biasing force to return the amplitude center to the reference position.

In this way, even when one end side of the first vibration excitation member 40U and the second vibration excitation member 40D is formed as a free end, the flapping device 200 according to the third embodiment can return the amplitude centers of the first vibration excitation member 40U and the second vibration excitation member 40D to the reference position (scheduled amplitude center). For this reason, according to the flapping device 200 described above, even higher precision and stability of control can be expected.

Although the configurations and the operations and the effects of the flapping devices 1, 100, 200 according to the first embodiment to the third embodiment of the present invention have been described as above, the flapping devices 1, 100, 200 according to the present invention are not limited to the embodiments described above, and various modifications can be made.

For example, the pair of blades 2, 2 can be formed in various shapes and sizes. In this embodiment, although the pair of blades 2, 2 are disposed, the number of blades 2 can be appropriately changed, for example, to two pairs or the like. The first blade shaft 20, the second blade shaft 21, and the blade main body 22 can be formed in various shapes and sizes, and the direction of formation can be appropriately changed.

In this embodiment, although a case in which outrunner motors are used as DC motors in the drive sources 30, 30 is illustrated as an example, various motors and the like capable of exerting a driving force can be used in the drive sources 30, 30. For example, the drive source 30, 30 may be configured using in-runner motors as DC motors. In this embodiment, although the first drive source 30U and the second drive source 30D are configured using the same outrunner motors, different types of drive sources can be used in the drive sources.

In this embodiment, although spur gears are used for the first driven part 10U and the second driven part 10D, and these are driven by the first drive gear 15U and the second drive gear 15D that are pinion gears, the present invention is not limited thereto. Various forms of the first driven part 10U and the second driven part 10D can be used. For example, the first driven part 10U and the second driven part 10D may be formed by pulleys or the like and driven using belts or the like. The first drive gear 15U and the second drive gear 15D can also be used not only in the form of gears but in various forms in accordance with the form of the first driven part 10U and the second driven part 10D.

In this embodiment, although torsion springs are used as the first vibration excitation member 40U, the second vibration excitation member 40D, the third vibration excitation member 41U, and the fourth vibration excitation member 41D, the vibration excitation members are not limited thereto. The first vibration excitation member 40U, the second vibration excitation member 40D, the third vibration excitation member 41U, and the fourth vibration excitation member 41D are not limited to torsion springs, but various types thereof can be used. In addition, in this embodiment, although the same type of torsion spring is used as the first vibration excitation member 40U, the second vibration excitation member 40D, the third vibration excitation member 41U, and the fourth vibration excitation member 41D, different types of vibration excitation members can be respectively used as the vibration excitation members. The arrangement of the first vibration excitation member 40U, the second vibration excitation member 40D, the third vibration excitation member 41U, and the fourth vibration excitation member 41D can be changed in various ways within the scope of the present invention. In this embodiment, although control is performed in an integrated manner by a single control unit 60, the control unit 60 may be composed of multiple units by dividing the control unit by function or the like.

In this embodiment, although the second blade shaft 21 is rotatably connected to the link member 53 in the fourth rotation axial surrounding direction, the second blade shaft 21 may be connected directly or indirectly to the second driven part 10D, in addition to being connected only through the link member 53. The link member 53 can be formed in various shapes and sizes in accordance with the direction of formation of the second blade shaft 21. A plurality of link members 53 may be disposed as is necessary. The fourth rotation axial line direction and the fifth axial line direction can be formed in various directions in accordance with the direction of formation of the second blade shaft 21.

In this embodiment, although control of stopping the output of driving forces of the first drive source 30U and the second drive source 30D is performed before a predetermined time at which the rotation speeds of the first drive source 30U and the second drive source 30D become zero, the timing at which the output is stopped can be appropriately changed in accordance with the characteristics of the motor and the like that are used. In this embodiment, although control of resuming the output of driving forces of the first drive source 30U and the second drive source 30D is performed at a time point at which the forward movement or the backward movement of the blade 2 is switched in accordance with the restoring forces of the first vibration excitation member 40U and the second vibration excitation member 40D, the timing at which the output of driving forces is resumed can be appropriately changed in accordance with characteristics of the motor and the like that are used as well.

The offset amounts in the first offset control and the second offset control performed by the control unit 60 can be set to various offset amounts depending on the flight modes of the flapping devices 1, 100, 200. The offset amounts in the first offset control and the second offset control may be the same or may be different from each other depending on the flight mode.

In this embodiment, although the control unit 60 performs control of configuring a difference between phases of outputs of the first drive source 30U and the second drive source 30D such that the blades 2 are inclined at a predetermined angle in a direction opposite to the direction of travel, the angle at which the blades 2 are inclined can be set to various angles depending on a flight mode, flight environments, and the like. The control of the blades 2 is not limited to that of the embodiments described above, and various types of control can be performed depending on the flight mode and the like.

Although various embodiments and modified example of the flapping device according to the present invention have been described as above, the present invention is not limited to those illustrated in the embodiments and the modified examples described above, and it can be easily understood by those skilled in the art that there can be other embodiments from the teachings and spirit thereof in a range not departing from the scope of the claims.

INDUSTRIAL APPLICABILITY

The flapping device according to the present invention can be used for various types of surveys, repairs, photography, and the like in the air.

REFERENCE SIGNS LIST

1 Flapping device
2 Blade
3 Drive unit
7 Body
10U First driven part
10D Second driven part
20 First blade shaft
21 Second blade shaft
22 Blade main body
30 Drive source
30U First drive source
30D Second drive source
40 Vibration excitation member
40U First vibration excitation member
40D Second vibration excitation member
41U Third vibration excitation member
41D Fourth vibration excitation member
53 Link member
60 Control unit
70U Support part
70D Support part
70M Intermediate support part
100 Flapping device
200 Flapping device

The invention claimed is:
1. A flapping device comprising:
a pair of blades; and
a pair of drive units disposed in correspondence with the pair of blades,
wherein the drive unit includes:
a first drive source;
a second drive source;
a first driven part receiving power output from the first drive source and rotating around a first rotation axial line;
a second driven part receiving power output from the second drive source and rotating around a second rotation axial line;
a first vibration excitation member applying a biasing force to the first driven part in a direction opposite to a rotation direction of the first driven part in accordance with rotation of the first driven part;
a second vibration excitation member applying a biasing force to the second driven part in a direction opposite to a rotation direction of the second driven part in accordance with rotation of the second driven part; and
a control unit performing output control of driving forces of the first drive source and the second drive source, and
wherein the blade has:
a first blade shaft extending in a predetermined axial line direction and being connected to the first driven part on a one end side and connected rotatably in a third rotation axial line surrounding direction intersecting the first rotation axial line;

a second blade shaft extending in a direction intersecting the first blade shaft and being connected to the second driven part on a one end side and connected rotatably in a fourth rotation axial line surrounding direction intersecting the second rotation axial line; and a blade main body disposed over the first blade shaft and the second blade shaft.

2. A flapping device comprising:

a pair of blades; and a pair of drive units disposed in correspondence with the pair of blades, wherein the drive unit includes:

a first drive source;

a second drive source;

a first driven part receiving power output from the first drive source and rotating around a first rotation axial line;

a second driven part receiving power output from the second drive source and rotating around a second rotation axial line;

a first vibration excitation member applying a biasing force to the first driven part in a direction opposite to a rotation direction of the first driven part in accordance with rotation of the first driven part;

a second vibration excitation member applying a biasing force to the second driven part in a direction opposite to a rotation direction of the second driven part in accordance with rotation of the second driven part; and a control unit performing output control of driving forces of the first drive source and the second drive source, wherein the blade has:

a first blade shaft extending in a predetermined axial line direction and being connected to the first driven part on a one end side and connected rotatably in a third rotation axial line surrounding direction intersecting the first rotation axial line;

a second blade shaft extending in a direction intersecting the first blade shaft and being connected to the second driven part on a one end side and connected rotatably in a fourth rotation axial line surrounding direction intersecting the second rotation axial line; and a blade main body disposed over the first blade shaft and the second blade shaft, wherein the first vibration excitation member is connected to the first driven part on a one end side and is directly or indirectly connected to the first blade shaft on the other end side, and wherein the second vibration excitation member is connected to the second driven part on a one end side and is directly or indirectly connected to the second blade shaft on the other end side.

3. The flapping device according to claim 1, further comprising:

a link member being connected to the second driven part to be rotatable in a direction around a fifth axial line intersecting the second rotation axial line on a one end side, wherein the link member is formed such that the other end side extends toward the second blade shaft, and the second blade shaft is connected to the link member to be rotatable in the fourth rotation axial line surrounding direction.

4. The flapping device according to claim 1, wherein the first drive source and the second drive source are configured using outrunner motors as DC motors.

5. The flapping device according to claim 1, wherein the control unit performs control of stopping output of driving forces of the first drive source and the second drive source before a predetermined time at which rotation speeds of the first drive source and the second drive source become zero in switching of forward rotation or backward rotation of the first drive source and the second drive source and control of resuming the output of the driving forces of the first drive source and the second drive source at a time point at which forward movement or backward movement is switched in the blade in accordance with restoring forces of the first vibration excitation member and the second vibration excitation member.

6. The flapping device according to claim 1, wherein the control unit is able to execute:

first offset control of offsetting an amplitude center of the first vibration excitation member to one side or the other side around the first rotation axial line by a predetermined amount; and second offset control of offsetting an amplitude center of the second vibration excitation member to one side or the other side around the second rotation axial line by a predetermined amount, and wherein the first offset control and the second offset control are executed by applying a predetermined amount of offset to drive voltage waveforms of the first drive source and the second drive source.

7. The flapping device according to claim 2, further comprising:

a body supporting the pair of drive units;

a third vibration excitation member applying a biasing force to the first driven part in a direction opposite to the rotation direction of the first driven part in accordance with rotation of the first driven part; and a fourth vibration excitation member applying a biasing force to the second driven part in a direction opposite to the rotation direction of the second driven part in accordance with rotation of the second driven part, wherein the third vibration excitation member is connected to the body on a one end side and is directly or indirectly connected to the first blade shaft on the other end side, wherein the fourth vibration excitation member is connected to the body on a one end side and is directly or indirectly connected to the second blade shaft on the other end side, and wherein the third vibration excitation member and the fourth vibration excitation member are formed to be able to exert a biasing force that is smaller than the biasing forces of the first vibration excitation member and the second vibration excitation member and exert a biasing force capable of returning the amplitude center of the first vibration excitation member and the second vibration excitation member to a reference position.

8. The flapping device according to claim 1, wherein the control unit performs control of forming a difference between phases of outputs of the first drive source and the second drive source such that the blade is inclined in a direction opposite to a direction of travel by a predetermined angle.

9. The flapping device according to claim 1, further comprising:

a body supporting the pair of drive units, wherein the body has a pair of support parts disposed spaced apart, wherein the first drive source and the second drive source are arranged outside of the pair of support parts, and wherein the first vibration excitation member, the second vibration excitation member, the first driven part, and the second driven part are arranged between the pair of support parts.

* * * * *